US011836659B2

(12) United States Patent
Walker et al.

(10) Patent No.: US 11,836,659 B2
(45) Date of Patent: Dec. 5, 2023

(54) METHODS AND SYSTEMS FOR DEPLOYING EQUIPMENT REQUIRED TO MEET DEFINED PRODUCTION TARGETS

(71) Applicant: Freeport-McMoRan Inc., Phoenix, AZ (US)

(72) Inventors: Mary Amelia Walker, Phoenix, AZ (US); Nicholas Hickson, Phoenix, AZ (US); Robert Catron, Phoenix, AZ (US); Brian Vaughan, St. Louis, MO (US); Hung Jung Lu, St. Louis, MO (US)

(73) Assignee: Freeport McMoRan Inc., Phoenix, AZ (US)

( * ) Notice: Subject to any disclaimer, the term of this patent is extended or adjusted under 35 U.S.C. 154(b) by 0 days.

(21) Appl. No.: 17/545,276

(22) Filed: Dec. 8, 2021

(65) Prior Publication Data
US 2022/0101228 A1    Mar. 31, 2022

Related U.S. Application Data

(62) Division of application No. 17/202,655, filed on Mar. 16, 2021, now Pat. No. 11,244,262.
(Continued)

(51) Int. Cl.
*G06Q 10/0631* (2023.01)
*G06Q 10/0635* (2023.01)
*G06N 7/01* (2023.01)

(52) U.S. Cl.
CPC ... *G06Q 10/06313* (2013.01); *G06Q 10/0635* (2013.01); *G06Q 10/06315* (2013.01); *G06N 7/01* (2023.01)

(58) Field of Classification Search
CPC ....... G06Q 10/06313; G06Q 10/06315; G06Q 10/0635; G06N 7/01
See application file for complete search history.

(56) References Cited

U.S. PATENT DOCUMENTS 5,327,347 A    7/1994  Hagenbuch
7,644,005 B1   1/2010  Billiotte et al.
(Continued)

FOREIGN PATENT DOCUMENTS

CN    102466746 A  *  5/2012
CN    107688910 A  *  2/2018

OTHER PUBLICATIONS

Alhasan et al. "Earthwork Haul-Truck Cycle-Time Monitoring—A Case Study" (Mar. 2016) (https://intrans.iastate.edu/app/uploads/2018/03/earthwork_haul-truck_cycle-time_monitoring_case_study_w_cvr-1.pdf) (Year: 2016).*
(Continued)

*Primary Examiner* — Sujay Koneru
(74) *Attorney, Agent, or Firm* — Fennemore Craig, P.C.

(57) ABSTRACT

Methods of deploying shovels and haul trucks to meet a defined production target may include: Determining at least one production constraint for a shovel and a material processing system; estimating an effect of entropy on a cycle time of the haul trucks to produce a future cycle time estimate; estimating an effect of entropy on a material processing time of the material processing system to produce a future material processing time estimate; predicting whether a delay will occur during the operation of the shovel, the haul trucks, and the material processing system; estimating a duration of the predicted delay; determining a number of shovels and a number of haul trucks required to meet the defined production target based on the determined production constraint, the future cycle time estimate, the future material processing time estimate, and the duration of
(Continued)

the predicted delay; and deploying the determined number of shovels and the determined number of haul trucks.

18 Claims, 8 Drawing Sheets

Related U.S. Application Data

(60) Provisional application No. 62/990,515, filed on Mar. 17, 2020.

(56) References Cited

U.S. PATENT DOCUMENTS

| | | | |
|---|---|---|---|
| 9,009,095 B1 | 4/2015 | Fafri et al. | |
| 10,380,522 B1 | 8/2019 | Brahms | |
| 10,481,579 B1 | 11/2019 | Putman et al. | |
| 2003/0069680 A1 | 4/2003 | Cohen et al. | |
| 2003/0146871 A1* | 8/2003 | Karr | G01S 5/0009 |
| | | | 342/465 |
| 2004/0220846 A1* | 11/2004 | Cullick | G06Q 10/0637 |
| | | | 705/7.22 |
| 2009/0096637 A1 | 4/2009 | Olson et al. | |
| 2009/0327011 A1* | 12/2009 | Petroff | G01C 21/343 |
| | | | 705/5 |
| 2012/0288328 A1 | 11/2012 | Minich | |
| 2013/0054133 A1 | 2/2013 | Lewis et al. | |
| 2014/0089035 A1 | 3/2014 | Jericho et al. | |
| 2015/0310674 A1 | 10/2015 | Humphrey et al. | |
| 2016/0063419 A1 | 3/2016 | Martinez et al. | |
| 2016/0076906 A1* | 3/2016 | Hinnegan | G01C 21/3415 |
| | | | 701/408 |
| 2016/0238403 A1 | 8/2016 | Brown et al. | |
| 2016/0267390 A1 | 9/2016 | Cogill et al. | |
| 2016/0342915 A1* | 11/2016 | Humphrey | G05D 1/0297 |
| 2017/0205814 A1 | 7/2017 | Marsolek | |
| 2017/0351241 A1 | 12/2017 | Bowers et al. | |
| 2018/0284758 A1 | 10/2018 | Cella et al. | |
| 2018/0293053 A1 | 10/2018 | Parker et al. | |
| 2019/0129405 A1 | 5/2019 | Cella et al. | |
| 2019/0220827 A1 | 7/2019 | Cogill et al. | |
| 2019/0265684 A1* | 8/2019 | Torkoly | G06Q 40/00 |
| 2020/0173791 A1 | 6/2020 | Misaki | |
| 2020/0225655 A1 | 7/2020 | Cella et al. | |
| 2020/0286042 A1 | 9/2020 | Lee et al. | |
| 2021/0109690 A1 | 4/2021 | Weaver et al. | |
| 2021/0118066 A1 | 4/2021 | Walker et al. | |
| 2021/0174279 A1* | 6/2021 | Hill | G06Q 10/103 |

OTHER PUBLICATIONS

PCT International Search Report and Written Opinion, dated May 28, 2021, for corresponding International Application No. PCT/US2021/022494, 10 pages.

Jaoua et al., (2012), "Specification o an intelligent simulation-based real time control architecture: Application to truck control system," Computers in Industry, 63, 882-894. www.elsevier.com/locate/compind; DOL: 10.1016/j.compind.2012.07.002; Abstract; p. 884 para 3; p. 888 para 3; p. 889 para 13; p. 891 para 2.

Asbjornsson et al., (2016), "Modeling of discrete downtime in continuous crushing operation," Minerals Engineering, 98, 22-29 www.elsevier.com/locate/mineng; DOL: 10.1016/j. mineng.2016.07.003; Abstract; p. 23 para7; p. 26 para 4; p. 27 para 1,2.

European Search Report, dated Dec. 17, 2021, for European Patent Application No. 21733881.3, 14 pages.

Notice of Allowance, dated Dec. 15, 2021, for Canadian Patent Application No. 3,124,674, 1 page.

Australian Examination Report No. 1, dated May 17, 2022, for Australian Patent Application No. 2021204532, corresponding to International Application No. PCT/US2021/022494, 4 pages.

Chilean Official Action, dated Jun. 17, 2022, for Chilean Patent Application No. 2184-2021, corresponding to International Application No. PCT/US2021/022494, 13 pages.

* cited by examiner

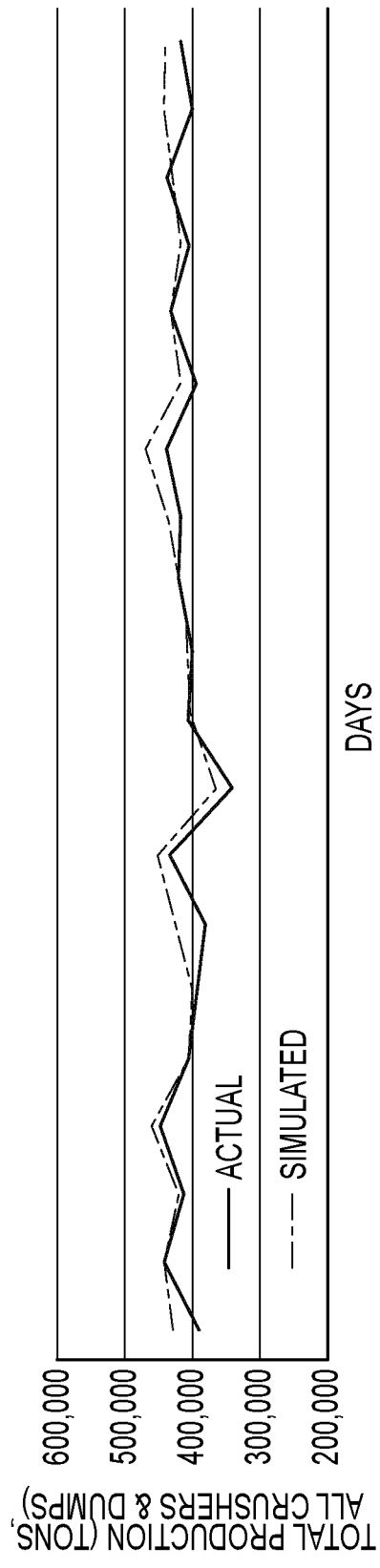
FIG. 8
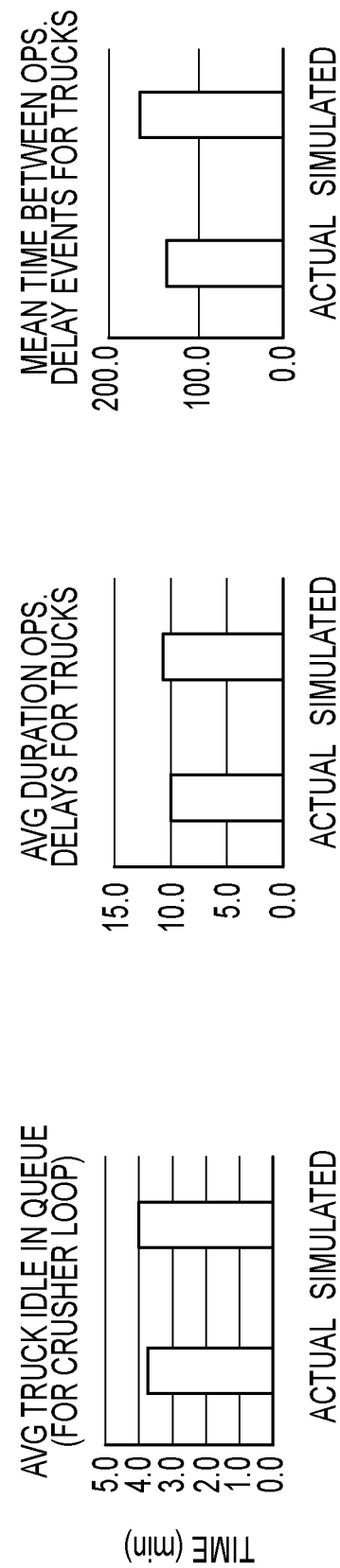
FIG. 9a
FIG. 9b
FIG. 9c

METHODS AND SYSTEMS FOR DEPLOYING EQUIPMENT REQUIRED TO MEET DEFINED PRODUCTION TARGETS

CROSS-REFERENCE TO RELATED APPLICATIONS

This application is a divisional of co-pending U.S. patent application Ser. No. 17/202,655, filed on Mar. 16, 2021, now U.S. Pat. No. 11,244,262, which claims the benefit of U.S. Provisional Patent Application No. 62/990,515, filed on Mar. 17, 2020, both of which are hereby incorporated herein by reference for all that they disclose.

TECHNICAL FIELD

The present invention relates to mining operations in general and more particularly to methods and systems for deploying equipment required to meet defined production targets.

BACKGROUND

Mining operations typically involve the delivery of large amounts of earthen materials, such as excavated ore, to various types of material processing systems to recover metals or other valuable minerals. In a mining operation, such further processing usually first involves one or more comminution or size-reduction steps to reduce the size of the excavated ore from a relatively coarse size to a finer size suitable for subsequent processing. Thereafter, the size-reduced ore may be subjected to any of a wide range of processes to separate the commercially valuable minerals from the waste material or gangue.

In a typical open-pit mining operation, the ore to be mined is periodically fractured (e.g., by blasting). Large shovels are then used to load the fractured ore into haul trucks. The haul trucks then carry the excavated ore to other locations and processing systems, such as stockpiles, ore crushers, and grinders, for further processing. Open-pit mining operations are conducted on a large scale and a given open pit mine may involve the use of a large number of shovels, haul trucks, and crushers in order to process the large volumes of excavated ore involved.

The overall efficiency of the mining operation is based in part on the efficiency of the equipment and processes for delivering the excavated ore to the various locations for further processing. Part of that overall efficiency involves a determination of the capacities of the various loading and conveying systems (e.g., the number of shovels and haul trucks) that are required to achieve a desired production target. For example, failing to provide sufficient capacity, e.g., numbers of shovels and/or haul trucks, will make it difficult, if not impossible, to achieve the desired production target. While the desired production target may be more easily achieved by providing additional numbers of shovels and/or haul trucks, the provision of an excessive number of shovels and/or haul trucks also results in inefficiencies and represents a sub-optimal use of resources. Indeed, providing an excessive number of shovels and or/or haul trucks may make it more difficult to achieve the desired production target as a result of increased wait or idle times and/or traffic congestion resulting from the provision of an excessive number of haul trucks.

While various methods of determining the appropriate equipment capacities (e.g., the number of shovels and haul trucks) that will be required to meet desired production targets are known and being used, such methods are typically empirical and usually require a significant amount of operational trial and error before arriving at the optimal capacities or numbers of equipment required to reach the desired production targets. Moreover, because the mining environment is constantly changing, even if the optimal numbers or capacities of the various systems happen to be reached, they will soon cease to be optimal as the mining operation progresses. As a practical matter, the optimal capacity is rarely reached and the mining operation will either involve insufficient or excessive equipment capacity, or will fail to consistently meet the desired production targets.

SUMMARY OF THE INVENTION

A method for deploying shovels and haul trucks to deliver sufficient excavated material to a material processing system to meet a defined production target may involve the steps of: Generating at least one production constraint for at least one of the shovels and the material processing system; estimating an effect of entropy on a cycle time of the haul trucks by performing a stochastic simulation based on historical cycle times to produce a future cycle time estimate for the haul trucks; estimating an effect of entropy on a material processing time associated with the material processing system by performing a stochastic simulation based on historical material processing times to produce a future material processing time estimate for the material processing system; predicting whether a delay will occur during the operation of at least one of the shovels, the haul trucks and the material processing system based on historical delay data; estimating a duration of the predicted delay by performing a stochastic simulation based on the historical delay data; determining a number of shovels and a number of haul trucks required to meet the defined production target based on the estimated production constraint, the future cycle time estimate, the future material processing time estimate, and the estimated duration of the predicted delay; and deploying the determined number of shovels and the determined number of haul trucks.

Also disclosed is a method of deploying a plurality of shovels and a plurality of haul trucks to deliver sufficient excavated material to each of a plurality of material processing systems to meet defined production targets for each of the plurality of material processing systems that may involve the steps of: Generating at least one production constraint for each of the plurality of shovels and for each of the plurality of material processing systems; identifying specific shovel and material processing system combinations; for each identified specific shovel and material processing system combination, estimating the effect of entropy on the cycle time of haul trucks by performing a stochastic simulation based on historical cycle times for each identified shovel and material processing combination to produce a future cycle time estimate; for each of the plurality of material processing systems, estimating an effect of entropy on a material processing time associated with the material processing system by performing a stochastic simulation based on historical material processing times to produce a future material processing time estimate; predicting whether a delay will occur during the operation of each of the plurality of shovels, haul trucks, and material processing systems based on historical delay data; estimating a duration of the predicted delay by performing a stochastic simulation based on the historical delay data; determining a number of shovels and a number of haul trucks required to meet the defined production target for each of the plurality of material processing systems based on the estimated production constraint, the future cycle time estimate, the future material processing time estimate, and the estimated duration of the predicted delay; and deploying the determined number of shovels and the determined number of haul trucks.

BRIEF DESCRIPTION OF THE DRAWINGS

Illustrative and presently preferred exemplary embodiments of the invention are shown in the drawings in which:

FIG. 8 are plots of simulated daily production totals for a mine versus daily production totals for the mine experienced during actual operations; and FIGS. 9(a,b,c) are bar graphs of simulated delays and wait times for haul trucks versus delays and wait times for haul trucks experienced during actual operations.

DETAILED DESCRIPTION OF THE PREFERRED EMBODIMENTS

Figure 1:
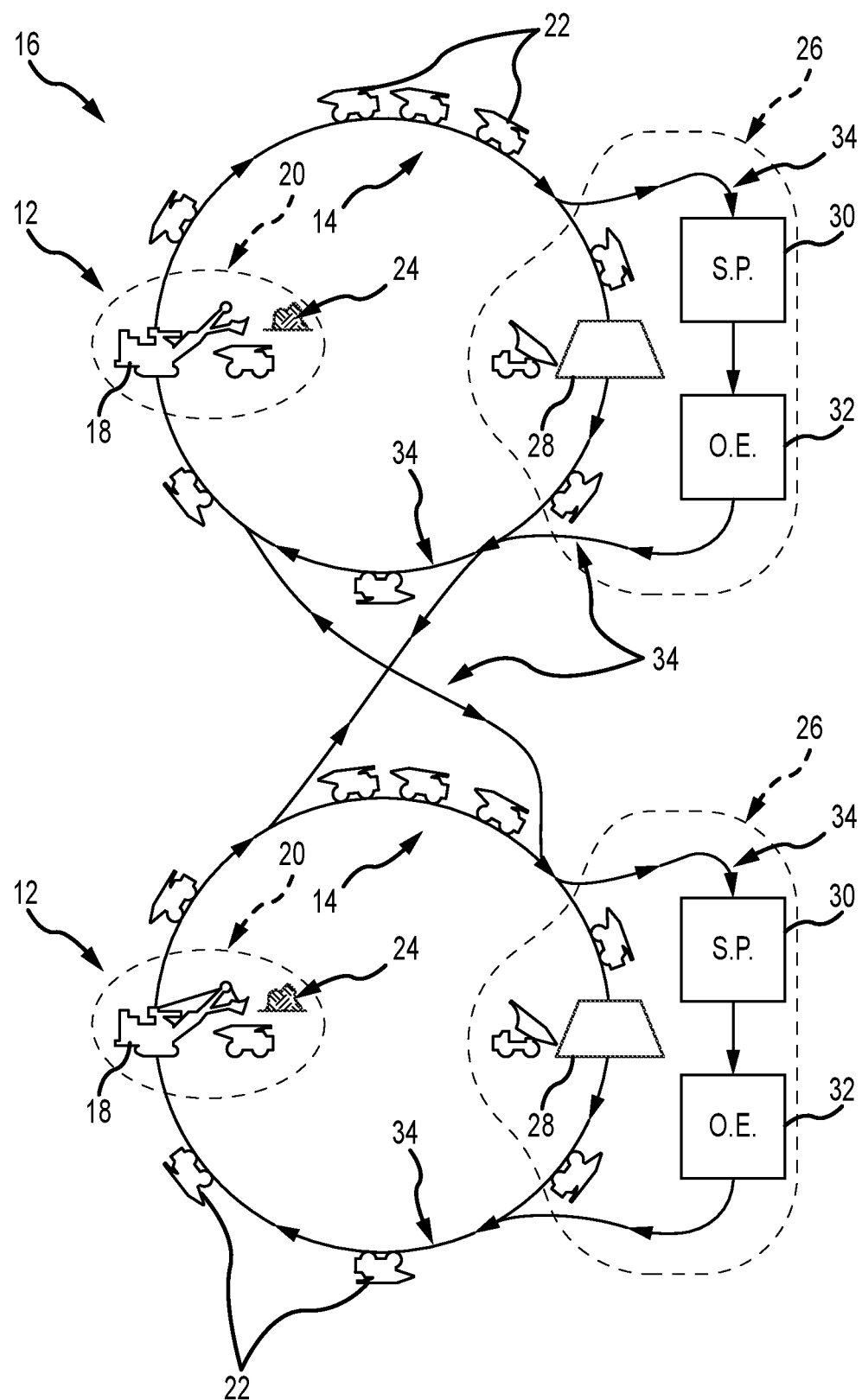
FIG. 1 is a pictorial representation of a mining operation illustrating a possible arrangement of various loading, conveying, and processing systems for processing excavated ore.

One embodiment 10 of a system for deploying equipment required to meet a defined production target is shown and described herein as it could be used to determine the capacities of a material loading system 12 and a material conveying system 14 used in a mining operation 16. See FIGS. 1 and 2. The determined capacities of the material loading and conveying systems 12 and 14 are sufficient to meet the defined production target. In the particular mining operation 16 depicted in FIG. 1, the material loading system 12 may comprise one or more shovels 18 located at respective loading areas 20 within the mine. The material conveying system 14 may comprise one or more haul trucks 22. The haul trucks 22 carry excavated material 24 from the loading area(s) 20 to a material processing system 26, such as one or more ore crushers 28, stockpiles 30, or other extraction systems 32. Haul trucks 22 travel to the material processing system(s) 26 and return to the loading areas 20 via a mine road network 34 in a process referred to herein as a 'cycle.' The elapsed time required for a haul truck 22 to complete a cycle is referred to herein as a 'cycle time.'

Figure 2:
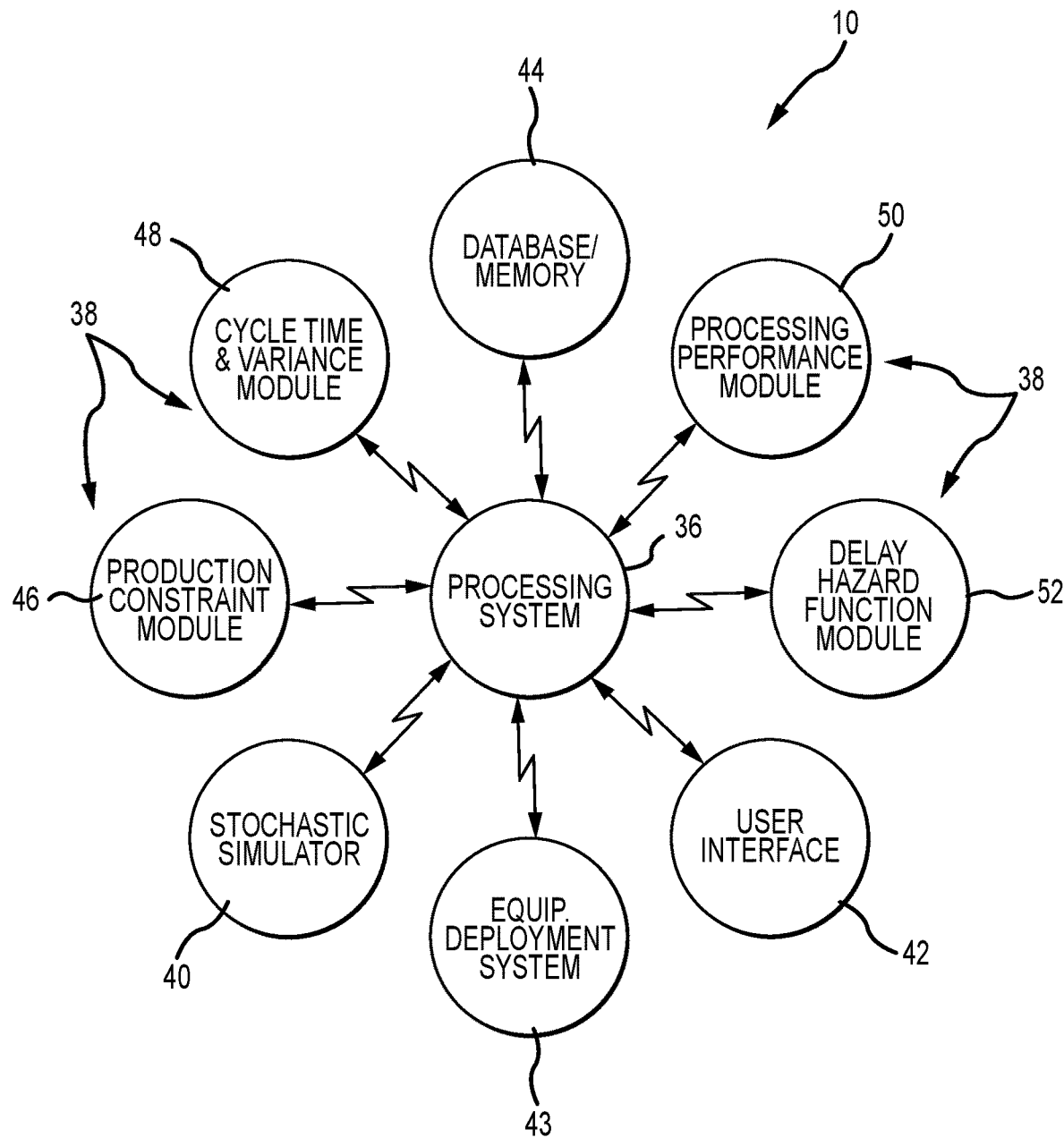
FIG. 2 is a schematic representation of one embodiment of a system for determining a system capacity required to meet a defined production target for a material processing system.

Referring now primarily to FIG. 2, the system 10 may comprise a computer processing system 36 that is operatively connected to or associated with a plurality of modules or tools 38, a stochastic simulator 40, a user interface system 42, and an equipment deployment system 43. Processing system 36 may also be operatively associated with a database 44, which may be used to store information and data required by processing system 36. In the particular embodiments shown and described herein, the various modules or tools 38 may comprise a production constraint module 46, a cycle time and variance module 48, a material processing system performance module 50, and a delay hazard function module 52.

Briefly described, the production constraint module 46 generates at least one of a process delay time and a planned downtime for at least one of the material loading system(s) 12 (e.g., shovels 18) and the material conveying system(s) 14 (e.g., haul trucks 22). The production constraint module 46 may also define production targets by the particular extraction process used by material processing system 26. In some embodiments, the production targets may be input by a system user (not shown) via user interface system 42.

Figure 4A:
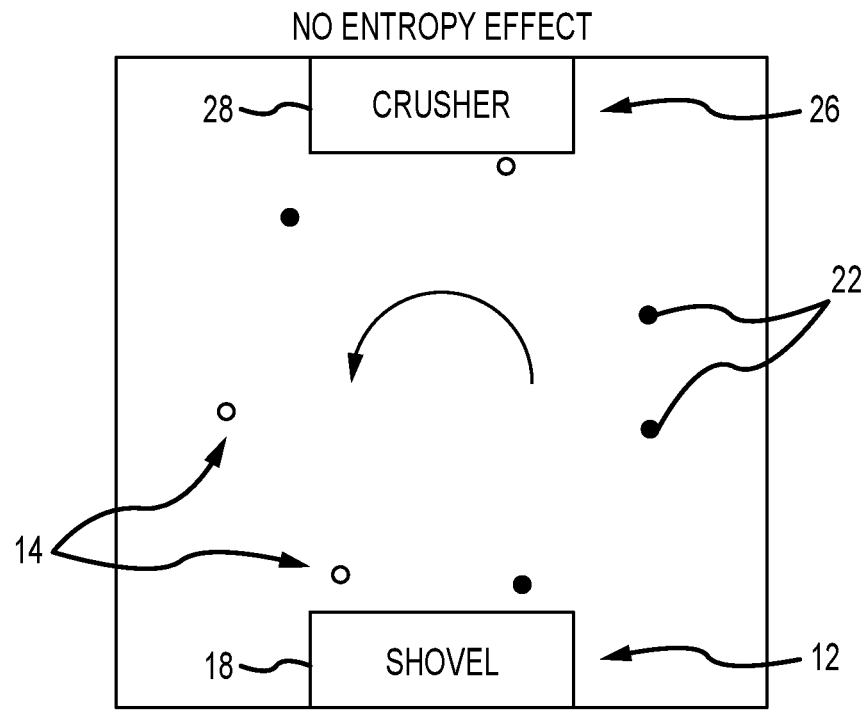
FIGS. 4(a,b) are schematic representations illustrating one consequence of the effect of entropy on the movement of haul trucks in a cycle.
Figure 4B:
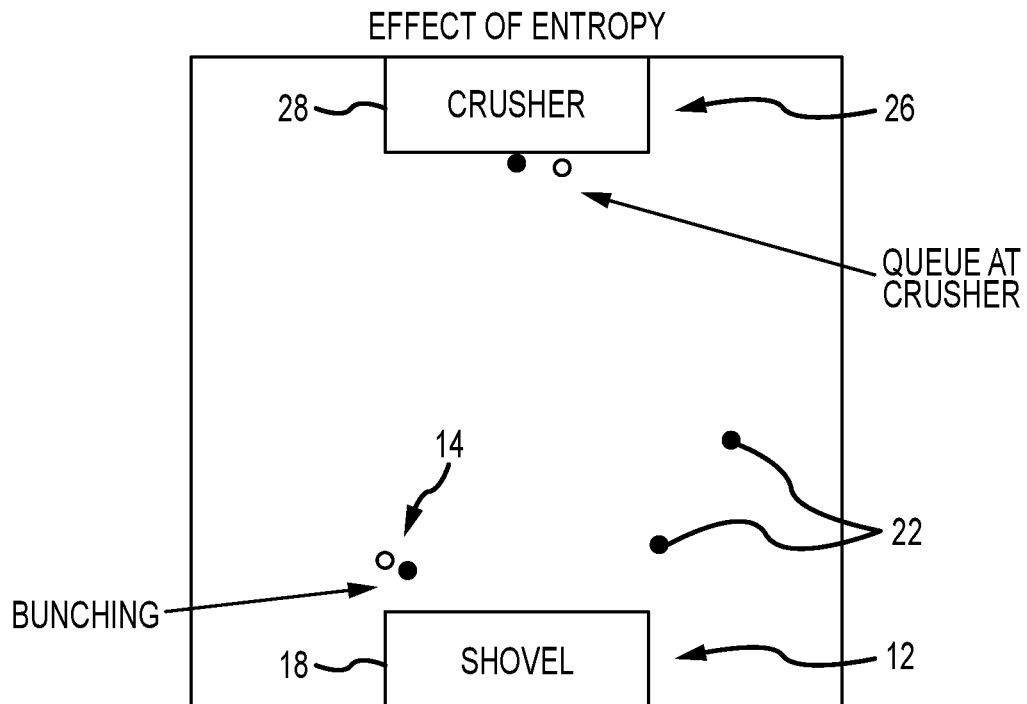

The cycle time and variance module 48 of system 10 estimates an effect of entropy on the cycle time of the material conveying system 14, e.g., haul trucks 22, in order to produce a future cycle time estimate for the material conveying system 14. As is known, entropy is a measure of the degree of disorder of a system. As used herein, the term entropy is also used to describe the degree of variability introduced into a system or process as a result of entropy changes. For example, in embodiments wherein the material conveying system 14 comprises one or more haul trucks 22, variations in the cycle times of the haul trucks 22 result in an accumulation or 'bunching' of the haul trucks at various points in the cycle, either at the material loading system 12, e.g., shovel 18, the material processing system 26, or along the mine road network 34. See FIGS. 4(a,b). The resulting cycle time variations reduce the number of cycles that the haul trucks 22 can complete in a given period of time compared to an ideal situation, i.e., with no variations in the cycle time. For example, and as will be described in further detail herein, in an actual mining operation variations in the cycle time reduce the number of cycles (e.g., loads) per shift from an ideal of 146 cycles or loads per shift to 121 loads per shift.

The cycle time and variance module 48 estimates the effect of entropy on the cycle time to produce the future cycle time estimate. Module 48 does this by providing historical cycle time data to stochastic simulator 40. Stochastic simulator 40 simulates systems, such as those systems described herein, having variables that change stochastically or randomly with individual probabilities. In the case of the cycle time and variance module 48, the stochastic simulator uses the historical cycle time data to simulate the cycle time 'system,' i.e., the cycles traveled by haul trucks 22 as they move between the material loading system 12 and the material processing system 26. Stated somewhat differently, the historical cycle time data are used by the stochastic simulator 40 to account for the effect of entropy on the material conveying system 14, e.g., haul trucks 22, to produce the future cycle time estimate for the material conveying system 14.

The processing system performance module 50 estimates the effect of entropy on a material processing time associated with the material processing system 26 (e.g., ore crusher 28) based on historical material processing time data. Here again, and as will be described in much greater detail below, variations in the material processing time (e.g., crush-out time) of the material processing system 26 (e.g., ore crusher 28) will result in variations in the production throughput of the material processing system 26. Processing system performance module 50 estimates the effect of entropy on the material processing time by providing to the stochastic simulator 40 historical material processing time data. Stochastic simulator uses the historical material processing time data to simulate the actual performance of the material processing system 26, i.e., the quantity of excavated material that may be processed by the system 26 in a given time (e.g., a shift).

The delay hazard function module 52 predicts whether a delay will occur during the operation of at least one of the material loading, material conveying, and material processing systems 12, 14, and 26 during a defined period of time, such as a working shift. If a delay is predicted to occur, the delay hazard function module 52 then estimates the duration of the delay. As will be described in much greater detail below, the delay hazard function module 52 first uses historical delay data to define a probability density. The probability density is then applied to a Hazard Function, which predicts whether a delay will occur (i.e., in the simulated system). If so, module 52 then 'calls' stochastic simulator 40 which uses the historical delay data to determine the duration of the predicted delay. The delay hazard function module 52 will then insert the predicted delay and the estimated time duration of the predicted delay at the appropriate point in the mining operation, i.e., during the cycles followed by the material conveying system 14, or during the material loading and dumping operations (e.g., at the material loading system 12 or the material processing system 26).

Figure 3:
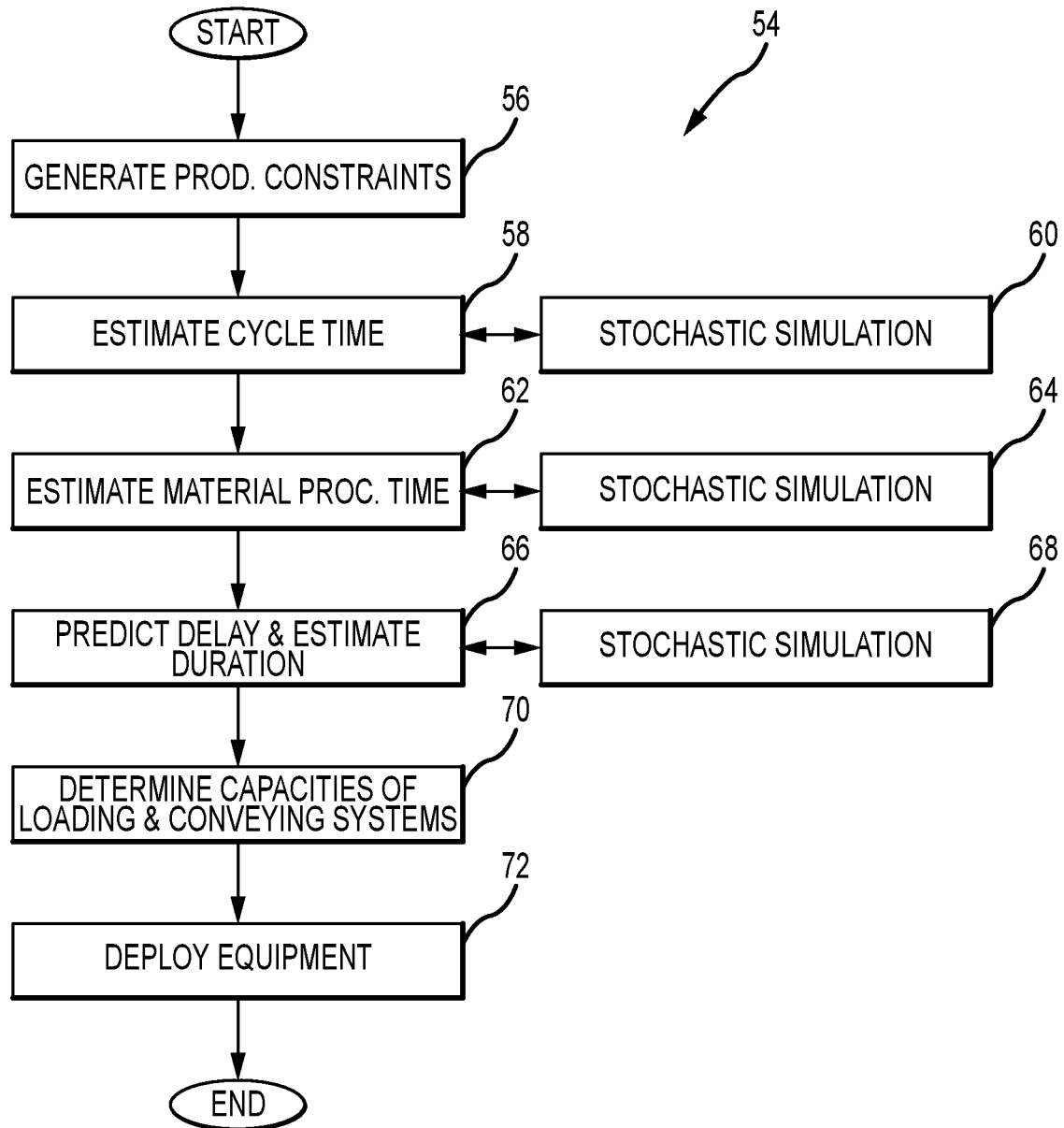
FIG. 3 is a flow chart of one embodiment of a method of determining the system capacity required to meet the defined production target.

Referring now to FIG. 3, processing system 36 may be configured or programmed to implement a method 54 to determine the capacities of loading and conveying systems 12 and 14 required to meet the defined production target. A first step 56 in method 54 involves generating at least one production constraint for at least one of the loading system 12 and the material processing system 26. Step 56 may be performed, at least in part, by the production constraint module 46 in the manner already described. A next step 58 involves estimating or accounting for an effect of entropy on the cycle time of the conveying system 14 to produce the future cycle time estimate for the conveying system 14. Step 58 may perform a stochastic simulation step 60 which uses historical cycle time data to simulate the cycle time of the system in a way that takes into account the random or stochastic variations in the historical cycle time data. Step 58 may be performed at least in part by the cycle time and variance module 48 in conjunction with stochastic simulator 40.

A next step 62 of method 54 involves estimating an effect of entropy on the material processing time to produce a future material processing time estimate for the material processing system 26. Step 62 may perform a stochastic simulation step 64 to account for the effect of entropy on the particular material processing system 26. Step 62 may be performed at least in part by the processing system performance module 50 in conjunction with stochastic simulator 40.

A next step 66 predicts whether a delay will occur during the operation of at least one of the loading, conveying, or material processing systems 12, 14, and 26 and estimates the duration of the predicted delay. Step 66 uses historical delay data to first determine the probability density. The Hazard Function uses the probability density to predict whether a delay will occur. If so, step 66 performs a stochastic simulation step 68 to estimate the duration of the predicted delay.

Method 54 then proceeds to step 70 which determines a loading system capacity (e.g., number of shovels 18) and a conveying system capacity (e.g., number of haul trucks 22) that will be required to meet the defined production target. The determined capacities are based at least on the estimated production constraint, the future cycle time estimate, the future material processing time estimate, and the estimated duration of any predicted delay. Thereafter, method 54 may then proceed to step 72 which deploys one or more of the material loading systems 12 to meet the determined loading system capacity. Step 72 also deploys one or more of the material conveying systems 14 to meet the determined conveying system capacity.

A significant advantage of the systems and methods of the present invention is that they may be used to provide highly accurate estimates or determinations of the system or equipment capacities required to meet defined production targets for material processing systems. Those estimates or determinations may then be used to deploy the equipment in numbers and capacities sufficient to meet the production targets. For example, and in the case of a mining operation, the present invention may be used to provide highly accurate determinations of the number of shovels and haul trucks that will be required to meet a defined production target for any of a wide range of material processing systems. Moreover, the systems and methods of the present invention may be performed repeatedly, e.g., on a shift-by-shift basis, to ensure that the deployed equipment capacities (e.g., material loading and conveying systems 12 and 14) will be sufficient to meet the production target for each particular shift.

The present invention therefore represents an improvement in the technology of material processing systems, particularly as it relates to efficiency and optimal use of system equipment and resources. Unlike prior methods, which are typically empirical and involve a significant amount of time and effort to consider the numerous variables and possible equipment combinations involved, the methods and systems of the present invention provide rapid and definitive determinations of the particular system or equipment capacities (e.g., number of shovels and haul trucks) that will be required to meet the defined production targets. Moreover, the systems and methods of the present invention may be used on a more or less continuous basis to ensure that the deployed capacities remain sufficient to meet the defined production targets on a shift-by-shift basis.

Another advantage of the present invention is that rather than merely being based on some theoretical, idealized, or predetermined capacities and operational scenarios, e.g., in terms of equipment capacities and operational performance, the present invention takes into account operational variations that tend to occur in actual operations, including both planned and unplanned production problems or "bottlenecks," and other occurrences that impact system productivity on a shift or daily basis. We have discovered that such operational variations and production problems can be more accurately accounted for by estimating the effect of entropy on the various elements, systems, and processes of material processing systems.

For example, in a mining operation wherein a plurality of haul trucks are used to convey excavated ore from one or more shovels to one or more continuous material processors, such as ore crushers, the haul trucks will tend to periodically 'bunch up,' at various points in the cycle, with an excessive number of haul trucks queuing up at either the loading area (e.g., at the shovel) or the discharge area (e.g., at the crusher). Such bunching can also occur on the mine road network between the shovels and the crusher. The frequency and/or severity of the delays associated with such truck bunching is due to a number of factors and may be exacerbated if an excessive number of haul trucks are used or if an insufficient number of shovels and/or ore crushers are provided.

Indeed, because the various elements, systems, and processes (e.g., loading, conveying, and processing systems) of the material processing system are interrelated, the effect of entropy on any one of the various elements, systems, and processes will also affect the material throughput and efficiencies of the other elements, systems, and processes. Stated somewhat differently, variations resulting from entropy in one element, system, or process will ripple though the material processing system, potentially affecting the other elements, system, and processes as well.

By taking into account the effects of such entropy on the various elements, systems, and processes of the material processing system, the present invention not only can make a far more accurate determination of the capacity required for each element, system, or process (e.g., numbers of haul trucks or shovels), but will also result in an overall material processing system (e.g., comprising the loading, conveying, and processing elements) that will be far more likely to meet the defined production targets during actual operation. Indeed, in one example embodiment, the systems and methods of the present invention were able repeatedly simulate the performance of an actual material handling system (e.g., mining operation) to within about 4% of the actual production, as best seen in FIG. 8. This represents a significant improvement over existing methods which consistently over-estimated actual production by 15% or more.

Having briefly described certain exemplary embodiments of systems and methods of the present invention, as well as some of their more significant features and advantages, various embodiments and variations of the systems and methods of the present invention will now be described in detail. However, before proceeding the description, it should be noted that while the various embodiments are shown and described herein as they could be used in an open pit mining operation to deploy the shovels and haul trucks necessary to deliver excavated material one or more ore crushers to meet a defined production target, the present invention is not limited to use in conjunction with mining applications. To the contrary, the present invention could be used in any of a wide range of applications that involve the batch delivery of materials to continuous processes, as would become apparent to persons having ordinary skill in the art after having become familiar with the teachings provided herein. Consequently, the present invention should not be regarded as limited to use in any particular type of application, environment, or equipment.

Referring back now to FIGS. 1 and 2, one embodiment 10 of a system according to the teachings of the present invention is shown and described herein as it could be used in a mining operation 16 to determine the capacities of a material loading system 12 and a material conveying system 14 required to meet a defined production target for a material processing system 26. In the particular embodiments shown and described herein, the loading system 12 may comprise one or more shovels 18 located at one or more respective loading areas 20 within the mine 16. The material conveying system 14 may comprise one or more haul trucks 22. The shovels 18 load excavated material 24 into the haul trucks 22 at the loading area(s) 20. The haul trucks 22 then carry the excavated material 24 to the material processing system 26 via a mine road network 34. The haul trucks 22 then dump the excavated material 24 at the location of the material processing system 26. The material processing system 26 may comprise one or more ore crushers 28, stockpiles 30, or other extraction systems 32 suitable for processing the excavated material 24. As mentioned earlier, the round trip travel of a haul truck 22 from the loading area 20 to the material processing system 26 and back again is referred to herein as a 'cycle.' The elapsed time required for a haul truck 22 to complete a cycle is referred to herein as a 'cycle time.'

Referring now primarily to FIG. 2, the system 10 may comprise a processing system 36 that is operatively connected to or associated with a plurality of modules or tools 38, a stochastic simulator 40, a user interface system 42, and an equipment deployment system 43. Processing system 36 may also be operatively associated with a database 44 which may be used to store information and data required by processing system 36. The various modules or tools 38 may comprise a production constraint module 46, a cycle time and variance module 48, a material processing system performance module 50, and a delay hazard function module 52.

Before proceeding with the description it should be noted that the particular configuration and architecture of the system 10 shown in FIG. 2 is illustrative only and serves to depict one possible interoperative arrangement of the various modules 38, simulator 40, and subsystems 42, 43, and 44 comprising system 10. Persons having ordinary skill in the art will readily recognize that other configurations and architectures are possible and could be utilized to achieve the same functionalities and interoperabilities described herein. Consequently, the present invention should not be regarded as limited to any particular configuration or architecture of the various modules 38, simulator 40, and subsystems 42, 43, and 44 illustrated in FIG. 2.

Continuing now with the description, processing system 36 may be operatively connected to the various modules 38 and simulator 40 so as to receive and transmit information and data from, to, and among the various modules 38 and simulator 40 in the manner described herein. In some embodiments, the processing system 36 may comprise one or more computer processors that are configured to perform the functions and data processing routines described herein.

Processing system 36 may be operatively connected to a user interface system 42, an equipment deployment system 43, and a database system 44. User interface system 42 may comprise any of a wide range of user interfaces, such as keyboards, pointers, and displays that are now known in the art or that may be developed in the future that are or would be suitable for use with the intended application. Similarly, database system 44 may comprise any of a wide range of systems, such as computer memory systems, that are now known in the art or that may be developed in the future that are or would be suitable for storing information and data required by the systems and methods of the present invention. However, because such user interface and database systems are well known in the art and could be readily provided by persons having ordinary skill in the art, the particular user interface and database systems 42 and 44 that may be used in conjunction with the present invention will not be described in further detail herein.

Equipment deployment system 43 is responsive to information and data produced by processing system 36 and may be used to deploy or redeploy the material loading and conveying systems 12 and 14 required to meet the defined production target. Equipment deployment system 43 may therefore comprise any of a wide range of systems and devices for accomplishing these tasks. By way of example, in one embodiment, equipment deployment system 43 may comprise an automated system configured to interface with a mine dispatch system (not shown) associated with the mining operation 16. The equipment deployment system 43 may issue instructions or commands to the mine dispatch system to provide the necessary deployment instructions for the material loading and conveying systems 12 and 14 (e.g., shovels 18 and haul trucks 22). In another embodiment, equipment deployment system 43 may operate independently of the mine dispatch system and may provide the necessary deployment instructions or commands directly to the shovels 18 and haul trucks 22. In still yet another embodiment, the equipment deployment system 43 may issue deployment instructions or recommendations to a human operator or supervisor (not shown) via user interface system 42. The operator or supervisor could then issue the appropriate deployment instructions or commands, either directly to the shovels 18 and haul trucks 22 or via the mine dispatch system. In any event, because the particular configuration of the equipment deployment system 43 will be dependent on the particular dispatch and/or operational systems present in a given operation, and because any systems or devices required to integrate the functionality of the equipment deployment system 43 into the particular dispatch or operational systems in use could be readily provided by persons having ordinary skill in the art after having become familiar with the teachings provided herein, the particular systems and configurations comprising the equipment deployment system 43 that may be utilized in the present invention will not be described in further detail herein.

The production constraint module 46 receives certain information and data input via user interface 42 and generates at least one of a process delay time and a planned downtime for at least one of the material loading system(s) 12 and the material conveying system(s) 14. In the context of the exemplary mining operation 16, certain process delay times and/or planned downtimes act differently than others and are treated or handled differently by the production constraint module 46. For example, operating delays caused by shift changes and blasting operations typically occur at specific times during the shift and also and shut down large portions of the mining operation. On the other hand, other types of events, such as those associated with individual pieces of equipment, may occur at different times during the shift and may not affect large portions of the mine.

In the case of operating or process delays associated with shift changes and blasting operations, i.e., that affect large portions of the mining operation, the production constraint module 46 handles these types delays by shortening the total production time associated with the working shift. For example, a 12-hour working shift might involve two shift changes (i.e., one at the beginning of the shift and one at the end of the shift) and a single blasting occurrence. If the operational downtime associated with each shift change is 0.25 hours and if the operational downtime associated with each blasting occurrence is 0.5 hours, then the total amount of productive time available during a 12 hour shift will not be 12 hours, but rather 11 hours. In such a situation, the production constraint module 46 would generate or produce a planned downtime of one hour for the material loading and conveying systems 12 and 14 for that particular shift.

Operating delays associated with other aspects of the mining operation, such as shovels 18 and crushers 28, may also be accommodated by production constraint module 46 but on a more individualized basis. For example, in one embodiment, the user interface 42 allows operations supervisors or short range planners (not shown) to input (e.g., via user interface system 42) planned downtimes by shift for individual shovels 18 and crushers 28. The production constraint module 46 then uses that information to remove the particular shovels 18 and crushers 28 from the various calculations when they are planned to be unavailable.

The production constraint module 46 may also receive predetermined or defined production targets for the various material processing systems 26 (e.g., crushers 28) via the user interface 42. Operations supervisors or short range planners may input the production targets based on the particular material processing system 26 to be used. For example, crusher production targets (e.g., tons per hour or tons per shift) for each individual ore crusher 28 may be input to the production constraint module 46 via the user interface 42. As described below, other modules 38 of system 10 may use the production targets and other information and data produced by production constraint module 46 to determine the equipment (e.g., number of shovels 18 and haul trucks 22) required to meet the defined production targets for each particular material processing system 26.

The cycle time and variance module 48 of system 10 estimates an effect of entropy on the cycle time of the haul trucks 22 and produces a future cycle time estimate for the haul trucks 22. As was briefly described above and with reference now to FIGS. 4(a) and 4(b), entropy results in variations in the cycle times of the haul trucks 22. Such cycle time variations typically result in an accumulation or 'bunching' of the haul trucks 22 at various points throughout the cycle, i.e., at the material loading system 12, e.g., shovel 18, the material processing system 26, e.g., ore crusher 28, or along the mine road network 34. The cycle time variations reduce the number of cycles that the haul trucks 22 can complete in a given period of time compared to an ideal situation, i.e., with no variations in the cycle time. By way of example, we have found that variations in the cycle time for one particular shift of one particular mining operation reduce to 121 the number of cycles or loads per shift from an ideal of 146 cycles or loads per shift.

The cycle time and variance module 48 estimates the effect of entropy on the cycle time to produce the future cycle time estimate. The cycle time estimate may be used to determine the total number of cycles that can be completed during the shift. In one embodiment, the cycle time and variance module 48 produces future cycle time estimates for each specific combination of material loading system 12 and material processing system 26 (e.g., shovel-dump combination) identified by the production constraint module 46. Module 48 estimates the future cycle time by providing historical cycle time data to stochastic simulator 40. Stochastic simulator 40 then simulates the cycle time 'system' for each particular combination and returns the result of the simulation to cycle time and variance module 48. Module 48 then uses the results of the simulation to produce the future cycle time estimate.

As briefly mentioned earlier, stochastic simulator 40 simulates systems, such as the systems described herein, having variables that change stochastically or randomly with individual probabilities. When used in conjunction with the various modules 38, stochastic simulator 40 predicts or forecasts the outcome of a particular system or variable based on multiple factors, typically historical data, associated with the system. In one embodiment, stochastic simulator 40 comprises a Monte Carlo simulator, although other types of stochastic simulators are known and could be used as well. Monte Carlo simulators are commonly used to model or simulate the probability of different outcomes in a process or system that cannot easily be predicted due to the intervention of random or stochastic variables. Briefly stated, the Monte Carlo simulation utilized by stochastic simulator 40 assigns multiple values to an uncertain variable to achieve multiple results. The simulator then averages the results to obtain an estimate. However, because Monte Carlo simulators are well-known in the art and could be readily provided by persons having ordinary skill in the art after having become familiar with the teachings provided herein, the particular Monte Carlo simulator that may comprise stochastic simulator 40 will not be described in further detail herein.

Figure 5:
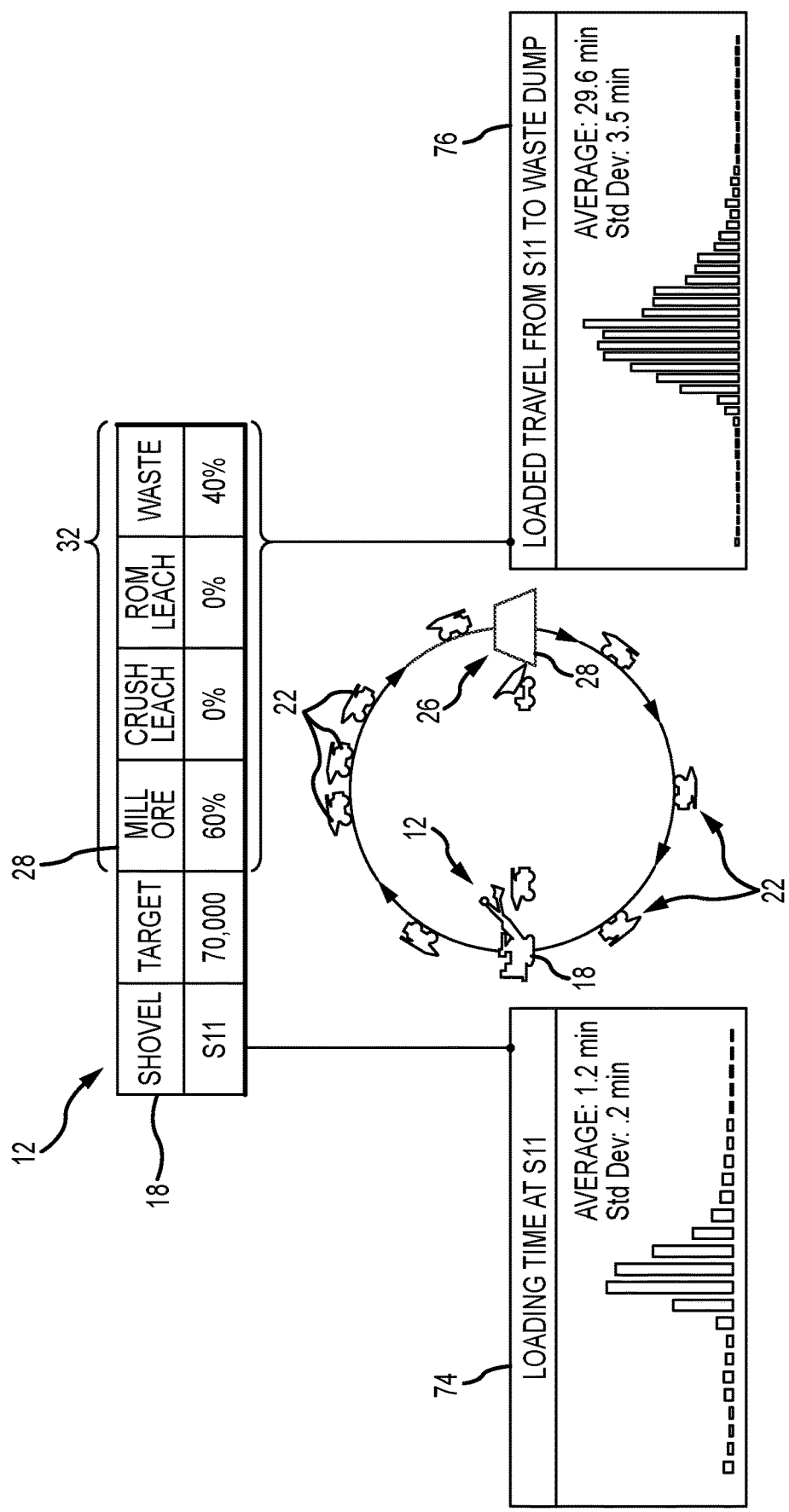
FIG. 5 is a schematic representation of a cycle between exemplary material loading and processing systems and histograms of historical cycle time data.

In the case of the cycle time and variance module 48, the stochastic simulator 40 uses the historical cycle time data to simulate the cycle time of the haul truck system, i.e., time it takes the haul trucks 22 to perform a round trip between the material loading system 12 and the material processing system 26. With reference now to FIG. 5, the historical cycle time data include data relating to historical averages and standard deviations of the load times and spot times for each material loading system 12, e.g, shovel 18. Such data may be developed as one or more histograms for each of the loading and spot times, either separately or in combination. The loading and spot times for each material loading system 12 (e.g., shovel 18) represents the time each material conveying system 14 (e.g., haul truck 22) spends at the loading area 20. By way of example, histogram 74 depicted in FIG. 5 represents historical data for the loading time at a particular loading location, in this example S11. The average loading time at location S11 is 1.2 minutes with a standard deviation of 2 minutes. Of course, a histogram (not shown) for spot times at the various locations may also be developed.

The historical cycle time data may also include historical averages and standard deviations of travel and dump times for each loop or cycle that involves a unique combination or pair of material conveying systems 14 and material processing system 26. As mentioned earlier, a given mining operation 16 may involve different material processing systems 26 for processing different types of excavated material 24. In certain applications, the excavated material 24 may predominantly comprise one of a plurality of defined material types. For example, and with reference now to FIG. 5, the defined material types may be categorized as "Mill Ore," "Crush Leach," "ROM (rune of mine) Leach," and "Waste." In the particular example depicted in FIG. 5, 60% of the excavated material is categorized as Mill Ore, with the remainder (e.g., 40%), being categorized as Waste, i.e., none of the loads are designated as "Crush Leach" or "ROM Leach." Of course, other distributions or "splits" of material types are possible, again depending on the particular situation.

The identification of particular material type may be collected or obtained by system 10 from the mine dispatch system (not shown), which may be provided with the particular material type by a system operator (not shown). The particular material type will typically be delivered to a different material processing system location. The cycle time and variance module 48 will use the historical travel time for each unique loop or cycle to determine or produce the future cycle time estimate for each unique loop or cycle.

Again and still referring to FIG. 5, the historical cycle time data may include data relating to historical averages and standard deviations of the travel and dump times for each unique or loop. Travel times may include travel loaded time (e.g, when the haul trucks 22 are loaded with the excavated material 24) and travel empty times (e.g., when the haul trucks 22 are empty), as they are typically different. Such data may be developed as one or more histograms for each of the travel and dump times, either separately or in combination. The travel and dump time for each material conveying system 14 (e.g., haul truck 22) represents the time required for the haul truck 22 to travel from the loading area 20 (i.e., after it has been filled with excavated material 24), to the particular material processing system 26 and back again. By way of example, histogram 76 depicted in FIG. 5 represents historical data for the travel time required to travel from loading area 20, e.g., S11 in this example, to the waste dump area. In this particular example, the average loaded travel time is 29.6 minutes with a standard deviation of 3.5 minutes. Of course, a histogram for dump times at the various locations may also be developed.

As briefly described above, the processing system performance module 50 estimates the effect of entropy on a material processing time associated with the material processing system 26 based on historical material processing time data. Variations in the material processing time of the material processing system 26 will result in variations in the production throughput of the material processing system 26. Processing system performance module 50 estimates the effect of entropy on the material processing time by providing to the stochastic simulator 40 historical material processing time data. Stochastic simulator uses the historical material processing time data to simulate the actual performance of the material processing system 26, i.e., the quantity of excavated material that may be processed by the system 26 in a given time (e.g., a shift).

Figure 6:
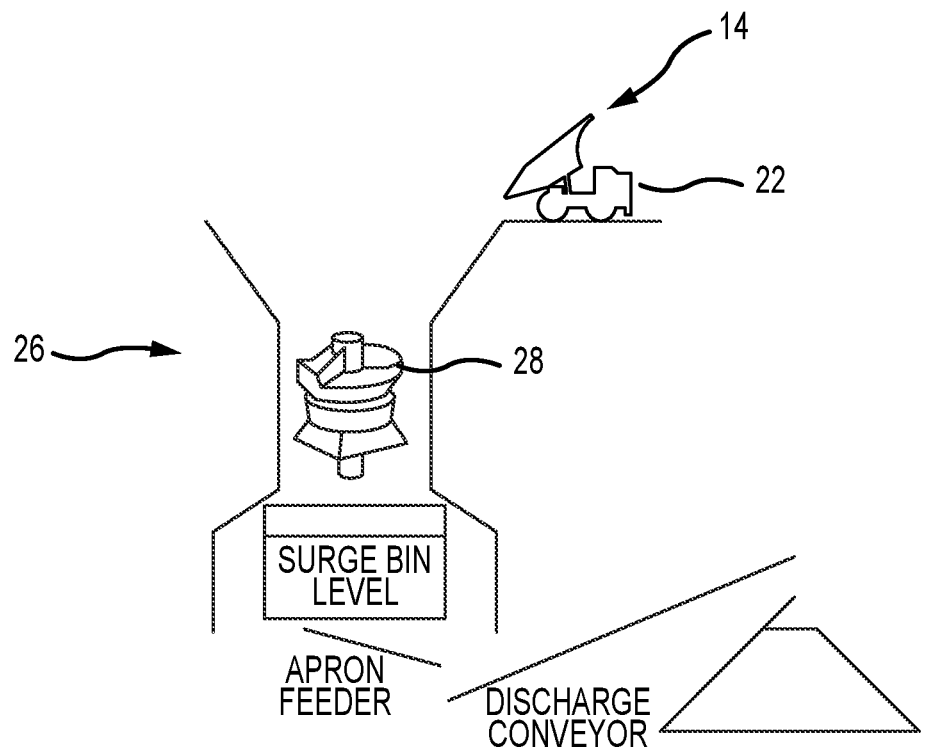
FIG. 6 is a schematic representation of an ore crusher and an example histogram of crush-out time data.
Figure 6:
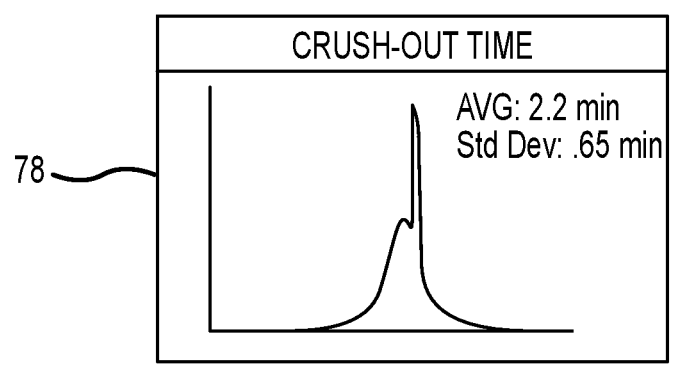

By way of example and with reference now to FIG. 6, in an example wherein the material processing system 26 comprises an ore crusher 28, the historical material processing time data may include historical averages and standard deviations of crush-out times for each particular crusher 28. In the particular embodiment shown and described herein, the crush out time is the quotient of a haul truck payload factor and the weight (e.g., in tons) of material (e.g., crushed ore) capable of being discharged by the ore crusher 28 in a defined period of time (e.g., 1-hour). The crush-out time data may be developed as a histogram 78. In the particular example depicted in FIG. 6, the average crush-out time for the particular ore crusher 28 involved is 2.2 minutes with a standard deviation of 0.65 minutes.

The processing system performance module 50 provides the historical crush-out time data to the stochastic simulator 40 which estimates the effect of entropy on the material processing time (e.g, crush-out time). The processing system performance module 50 then uses the simulation data from stochastic simulator 40 to produce the future material processing time estimate. Where the material processing system 26 comprises an ore crusher 28, the future material processing time estimate will be a crush-out time estimate for that particular ore crusher 28.

Figures 7A, 7B:
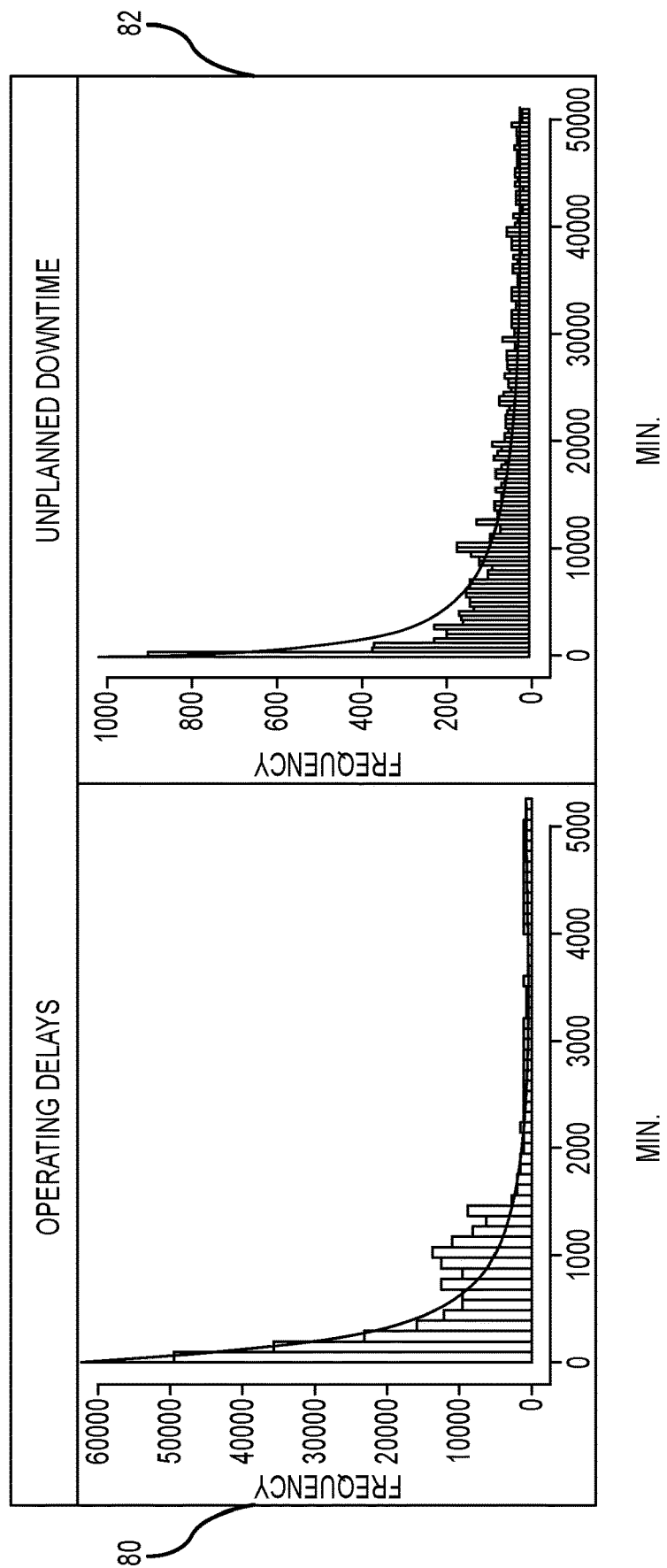
FIGS. 7(a,b) are histograms of historical delay data.

The delay hazard function module 52 predicts whether a delay will occur during the operation of at least one of the material loading, material conveying, and material processing systems 12, 14, and 26. If a delay is predicted to occur, the delay hazard function module 52 then estimates the duration of the predicted delay. With reference now to FIGS. 7(a,b), the delay hazard function module 52 uses historical delay data to define a probability density. In one embodiment, the historical delay data include operating delays and unplanned downtime delays associated with the material loading, conveying, and processing systems 12, 14, and 26, respectively. Operating delays may include delays associated with the regular operation of the equipment, such as time spent idling or in standby. Unplanned downtime delays may include delays resulting from equipment breakdowns or other unplanned delays. Such historical delay data may be developed as one or more histograms of the operating delays and the unplanned downtime delays for each system or piece of equipment. By way of example, histogram 80 depicted in FIG. 7(*a*) represents aggregated operating delays associated with shovels 18, haul trucks 22, and crushers 28. Histogram 82 depicted in FIG. 7(*b*) represents aggregated unplanned downtime delays associated with shovels 18, haul trucks 22, and crushers 28.

The historical distributions of delays and historical mean time between delays (e.g., for both operating and unplanned delay) define a probably density. Delay hazard function module 52 then applies the probability density to a Hazard Function which predicts whether a delay will occur. In one embodiment, the Hazard Function may be written as:

$$P(t_1, t_2) = h(t_2)\Delta t \qquad (1)$$

where:
P is the probability of a delay occurring between times $t_1$ and $t_2$ given no current delays;
$t_1, t_2$ are particular times;
h is the hazard function at time $t_2$; and
$\Delta t$ is a particular time interval.

By way of example, module 52 determines or calculates the delay probability P for each second of time. These processes are performed for each respective system, i.e., for each of the respective material loading, conveying, and processing systems 12, 14, and 26, resulting in a probability of delay determination for each respective system.

If a delay is predicted to occur, module 52 then 'calls' on stochastic simulator 40. Stochastic simulator 40 uses the historical delay data to estimate the duration of the predicted delay. Again, this simulation process is performed for the probability of delay for each of the respective material loading, conveying, and processing systems 12, 14, and 26, resulting in an estimated delay duration for the predicted delay(s) for each respective system. The delay hazard function module 52 then inserts the predicted delay at the appropriate point in the processing system, i.e., during the cycles followed by the material conveying system 14 (e.g., haul trucks 22), the material loading system 12 (e.g., shovels 18), or the material processing system 26 (e.g., ore crusher 28), as the case may be. That is, because the delay hazard function module 52 uses the historical delay data for each of the material loading, conveying, and processing systems 12, 14, and 26, separately, and determines the probability of and estimated delay times for each system separately, module 52 is able to insert the predicted delay at the appropriate point in the processing cycle.

The estimates or simulations provided by the various modules 38 have produced highly accurate and definitive results when applied to an actual mining operation. For example, and with reference to FIGS. 9(*a-c*) the systems and methods of the present invention have produced simulated idle and delay times that accurately take into account the effect of entropy, as compared with actual operations. FIG. 9*a* illustrates the actual and simulated average haul truck idle time for a unique haul truck/crusher loop. Similarly, the present invention accurately simulates the average duration of operational delays experienced by haul trucks, again compared with actual delays experienced during operation. FIG. 9*c* also illustrates good agreement between the mean time between operational delay events for haul trucks versus those experienced during actual operations.

Referring back now primarily to FIG. 2, processing system 36 may be configured or programmed to implement a method 54 to determine the capacities of loading and conveying systems required to meet a defined production target. A first step 56 in method 54 involves generating at least one production constraint for at least one of the loading system 12 and the material processing system 26. Step 56 may be performed, at least in part, by the production constraint module 46. The production constraints may include operating delays associated with shift changes, blasting, and/or other operations associated with the various aspects of the loading, conveying, and material processing systems 12, 14, and 26, as described earlier.

Step 58 estimates an effect of entropy on the cycle time of the conveying system 14 in order to produce the future cycle time estimate for the conveying system 14. Step 58 may be performed at least in part by the cycle time and variance module 48. As described above, the historical cycle time data may include historical averages and standard deviations of load time and spot time for each of the shovels 18. The historical cycle time data may also include historical averages and standard deviations of travel and dump times for each unique shovel/material processing loop or cycle. Step 58 may perform stochastic simulation step 60 to account for the effect of entropy on the haulage or conveying operation to produce the future cycle time estimate for the haul trucks 22. By way of example, stochastic simulation step 60 may include a Monte Carlo simulation, as described above.

Step 62 of method 54 estimates an effect of entropy on the material processing time to produce a future material processing time estimate for the material processing system 26. Step 62 may be performed at least in part by the processing system performance module 50. In step 62, historical material processing time data are used to produce the future material processing time estimate. In an embodiment wherein the material processing system 26 comprises an ore crusher 28, the historical material processing time data may include historical averages and standard deviations of crushout times for each particular crusher 28. Step 62 may implement a stochastic simulation step 64 to account for the effect of entropy on the crushing operation to produce the future material processing (i.e., crush-out) time estimate for the particular material processor 26, e.g., crusher 28. As described above, stochastic simulation step 64 may include a Monte Carlo simulation.

Step 66 determines a probability that a delay will occur in at least one of the loading, conveying, or material processing systems 12, 14, and 26. At least a portion of step 66 may be performed by the Delay Hazard function module 52 in which historical distributions of delays and historical mean time between delays are fed into a Delay Hazard function. Module 52 then uses the Delay Hazard function to calculate or determine the probability of a delay happening during any particular time interval, such as, for example, during every second of time. Step 66 may include step 68 in which a stochastic simulation determines if a delay will occur at any particular time. In one embodiment, stochastic simulation step 68 may comprise a Monte Carlo simulation.

Method 54 then proceeds to step 70 that determines a loading system capacity (e.g., number of shovels 18) and a conveying system capacity (e.g., number of haul trucks 22) that will be required to meet the defined production target. The determined capacities are based at least on the estimated production constraint, the future cycle time estimate, the future material processing time estimate, and the probability of delay. Thereafter, method 54 may then proceed to step 72 which deploys one or more of the material loading systems 12 to meet the determined loading system capacity. Step 72 also deploys one or more of the material conveying systems 14 to meet the determined conveying system capacity. In some embodiments, the processing system 36 may also present the determined loading system capacity and conveying system capacity in user-discernible form, such as, for example, on user interface system 42.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A method of deploying shovels and haul trucks to deliver sufficient excavated material to a material processing system to meet a defined production target, comprising:
generating at least one production constraint for at least one of the shovels and the material processing system;
estimating an effect of entropy on a cycle time of the haul trucks by performing a stochastic simulation based on historical cycle times to produce a future cycle time estimate for the haul trucks;
estimating an effect of entropy on a material processing time associated with the material processing system by performing a stochastic simulation based on historical material processing times to produce a future material processing time estimate for the material processing system;
predicting whether a delay will occur during the operation of at least one of the shovels, the haul trucks and the material processing system based on historical delay data, wherein said predicting whether a delay will occur comprises:
developing a histogram of operating delays from the historical delay data;
developing a histogram of unplanned downtime delays from the historical delay data;
determining a probability density based on the histograms of operating delays and unplanned downtime delays; and
applying the probability density to a Hazard Function to predict whether the delay will occur;
estimating a duration of the predicted delay by performing a stochastic simulation based on the historical delay data;
determining a number of shovels and a number of haul trucks required to meet the defined production target based on the estimated production constraint, the future cycle time estimate, the future material processing time estimate, and the estimated duration of the predicted delay; and
deploying the determined number of shovels and the determined number of haul trucks.

2. The method of claim 1, wherein said estimating the effect of entropy on the cycle time further comprises performing a stochastic simulation based on:
an average of one or more of historical load, spot, travel, and dump times for the haul trucks; and
a variability of one or more of the historical load, spot, travel, and dump times for the haul trucks.

3. The method of 2, wherein the variability of one or more of the historical load, spot, travel, and dump times for the haul trucks comprise a standard deviation of one or more of the historical load, spot, travel, and dump times for the haul trucks.

4. The method of claim 1, wherein said estimating the effect of entropy on the cycle time further comprises:
performing a stochastic simulation based on historical cycle times for loaded haul trucks; and
performing a stochastic simulation based on historical cycle times for empty haul trucks.

5. The method of claim 4, wherein
said performing a stochastic simulation based on the historical cycle times for loaded haul trucks is based on:
an average of respective historical load, spot, travel, and dump times for loaded haul trucks; and
a variability of the respective historical load, spot, travel, and dump times for the loaded haul trucks; and
wherein said performing a stochastic simulation based on the historical cycle times for empty haul trucks is based on:
an average of respective historical load, spot, travel, and dump times for empty haul trucks; and
a variability of the respective historical load, spot, travel, and dump times for the empty haul trucks.

6. The method of claim 5, wherein
the variability of the respective historical load, spot, travel, and dump times for the loaded haul trucks comprises standard deviations of the respective historical load, spot, travel, and dump times for the loaded haul trucks; and
wherein the variability of the respective historical load, spot, travel, and dump times for the empty haul trucks comprises standard deviations of the respective historical load, spot, travel, and dump times for the empty haul trucks.

7. The method of claim 1, wherein the material processing system comprises at least one crusher and wherein said estimating the effect of entropy on the material processing time further comprises performing a stochastic simulation of the material processing time based on:
an average of historical crush out times; and
a variability of the historical crush out times.

8. The method of claim 7, wherein the variability of the historical crush out times comprises a standard deviation of the historical crush out times.

9. The method of claim 1, wherein said estimating a duration of the predicted delay comprises performing a stochastic simulation based on the probability density.

10. The method of claim 1, wherein said predicting whether a delay will occur and said estimating a duration of the predicted delay are performed for each individual shovel, each individual haul truck, and the material processing system.

11. The method of claim 1, further comprising:
receiving data relating to at least one of a planned shift change, a planned equipment downtime, and a planned production target; and
wherein said generating one production constraint is based on the received data relating to the at least one of the planned shift change, the planned equipment downtime, and the planned production target.

12. The method of claim 1, further comprising establishing an acceptable level of risk that the determined number of shovels and the determined number of haul trucks will fail to meet the defined production target and wherein the determined number of shovels and the determined number of haul trucks are within the acceptable level of risk.

13. The method of claim 12, wherein establishing the acceptable level of risk comprises establishing a probability matrix.

14. A method of deploying a plurality of shovels and a plurality of haul trucks to deliver sufficient excavated material to each of a plurality of material processing systems to meet defined production targets for each of the plurality of material processing systems, comprising:

generating at least one production constraint for each of the plurality of shovels and for each of the plurality of material processing systems;

identifying specific shovel and material processing system combinations;

for each identified specific shovel and material processing system combination, estimating the effect of entropy on the cycle time of haul trucks by performing a stochastic simulation based on historical cycle times for each identified shovel and material processing combination to produce a future cycle time estimate;

for each of the plurality of material processing systems, estimating an effect of entropy on a material processing time associated with the material processing system by performing a stochastic simulation based on historical material processing times to produce a future material processing time estimate;

predicting whether a delay will occur during the operation of each of the plurality of shovels, haul trucks, and material processing systems based on historical delay data, wherein said predicting whether a delay will occur comprises:

developing a histogram of operating delays from the historical delay data;

developing a histogram of unplanned downtime delays from the historical delay data;

determining a probability density based on the histograms of operating delays and unplanned downtime delays; and applying the probability density to a Hazard Function to predict whether the delay will occur;

estimating a duration of the predicted delay by performing a stochastic simulation based on the historical delay data;

determining a number of shovels and a number of haul trucks required to meet the defined production target for each of the plurality of material processing systems based on the estimated production constraint, the future cycle time estimate, the future material processing time estimate, and the estimated duration of the predicted delay; and deploying the determined number of shovels and the determined number of haul trucks.

15. The method of claim 14, wherein said estimating the effect of entropy on the cycle time further comprises performing a stochastic simulation based on:

an average of one or more of historical load, spot, travel, and dump times for the haul trucks; and a variability of one or more of the historical load, spot, travel, and dump times for the haul trucks.

16. The method of claim 15, wherein the variability of one or more of the historical load, spot, travel, and dump times for the haul trucks comprise standard deviations of the respective historical load, spot, travel, and dump times for the haul trucks.

17. The method of claim 14, wherein said estimating the effect of entropy on the cycle time further comprises:

performing a stochastic simulation of cycle times for loaded haul trucks based on:

an average of respective historical load, spot, travel, and dump times for loaded haul trucks; and a variability of the respective historical load, spot, travel, and dump times for the loaded haul trucks; and performing a stochastic simulation of cycle times for empty haul trucks based on:

an average of respective historical load, spot, travel, and dump times for empty haul trucks; and a variability of the respective historical load, spot, travel, and dump times for the empty haul trucks.

18. The method of claim 14, wherein said estimating a duration of the predicted delay comprises performing a stochastic simulation on the probability density.

\* \* \* \* \*